Figure 1:
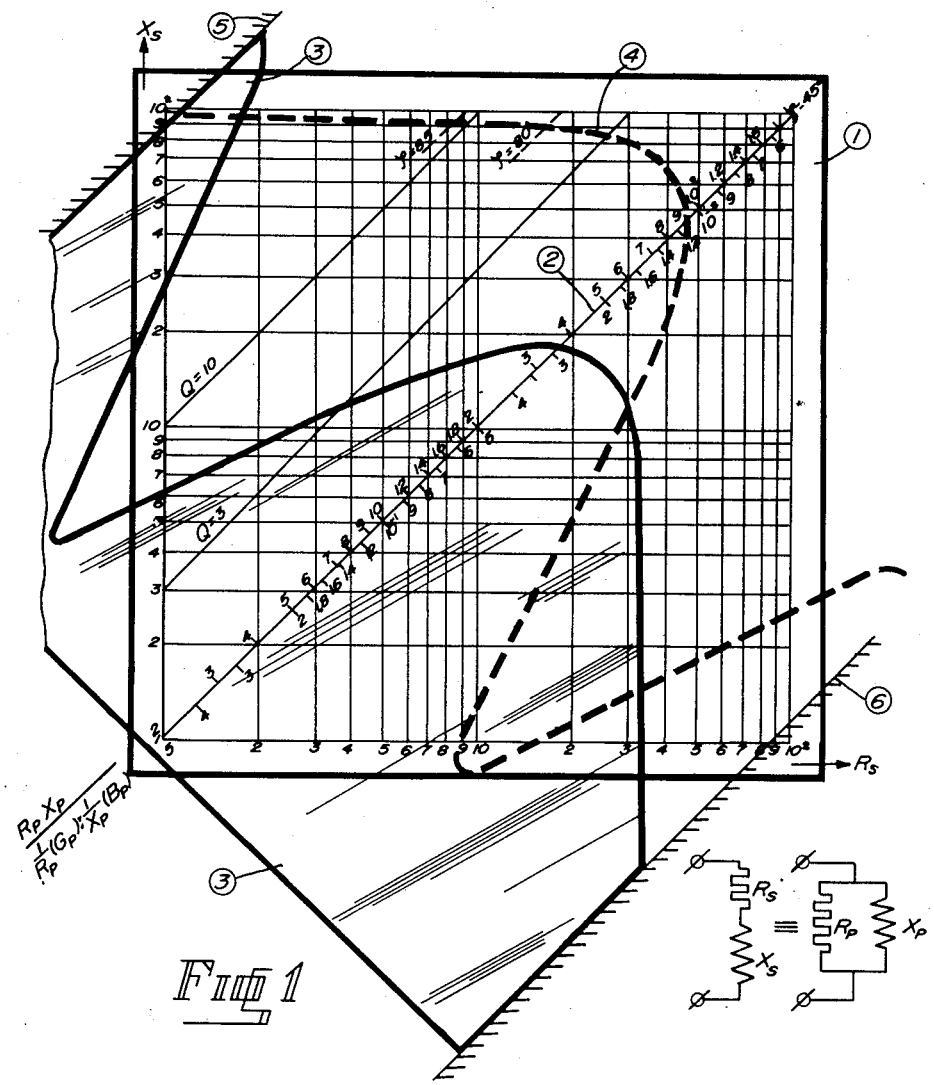

July 23, 1957

S. HEKSTER 2,800,279

DEVICE FOR DETERMINING THE RESULTANT OF SERIES OR PARALLEL
COMPLEX RESISTANCE IN ARBITRARY COMBINATIONS

Filed July 21, 1955

2 Sheets-Sheet 1

INVENTOR.
DR. SIEGFRIED HEKSTER
BY
Marshall, Marshall & Yeasting
ATTORNEYS

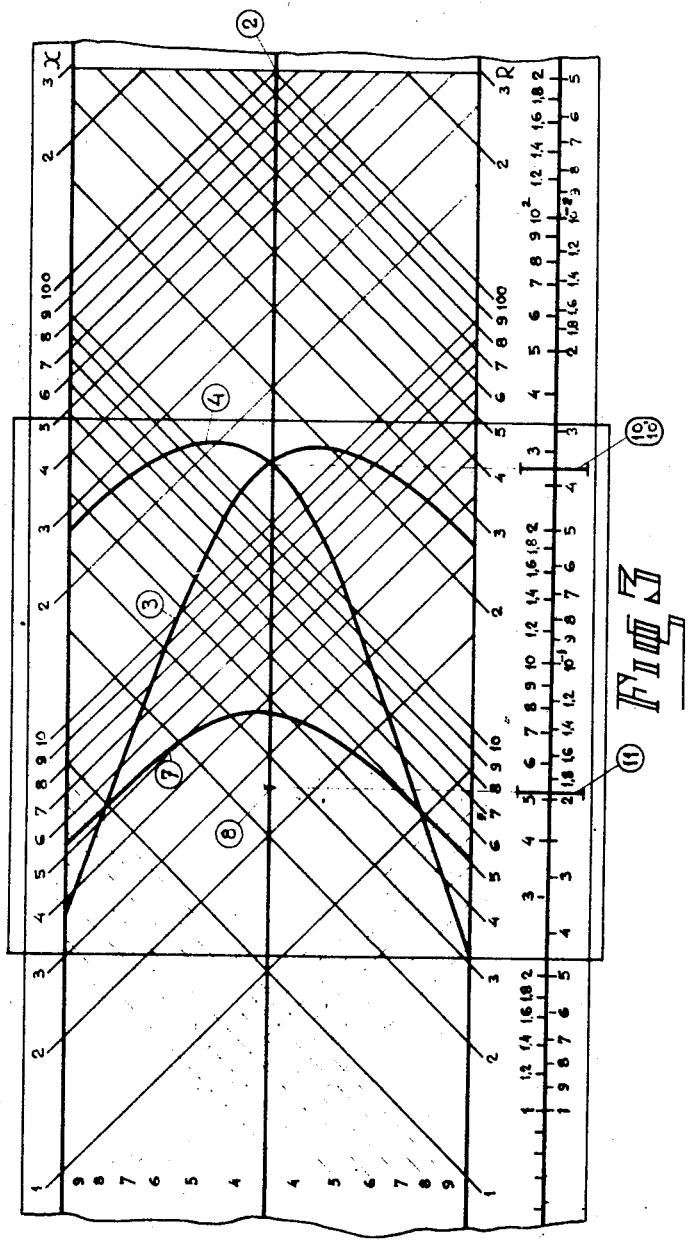

United States Patent Office
2,800,279
Patented July 23, 1957

2,800,279

DEVICE FOR DETERMINING THE RESULTANT OF SERIES OR PARALLEL COMPLEX RESISTANCE IN ARBITRARY COMBINATIONS

Siegfried Hekster, Oegstgeest, Netherlands

Application July 21, 1955, Serial No. 523,549

Claims priority, application Netherlands July 27, 1954

10 Claims. (Cl. 235—61)

The invention refers to a device for determining the resultant of series or parallel complex resistances in arbitrary combinations.

In such calculations in which each time a series connection of a resistance and a reactance is transferred into a parallel connection and vice versa, it is known to use circle-diagrams provided in a rectangular coordinate system in which on the $x$-axis circles are drawn for resistance values and on the $y$-axis circles for the reactances (positive and negative).

Each circle is tangent to the $y$-axis or the $x$-axis respectively at the origin and its centre lies on the $x$-axis or the $y$-axis respectively.

Such graphs are indicated e. g. in "Die Komplexe Berechnung von Wechselstromschaltungen" of Dr. H. H. Meinke, Berlin, 1949, pp. 79 and 80. (Ed. Walter de Gruyter & Co.)

In said diagrams said circles pass through the origin and the terminal point of the impedance vector drawn from the origin said vector being the resultant of the series-elements $R_s$ and $X_s$. The circle drawn on the resistance axis then cuts said axis at the point which forms the end of the vector $R_p$ whereas the other circle cuts the reactance-axis at a point, indicating the value $X_p$ so that from this the equivalent values of the elements of the parallel arrangement are found.

In a similar way an admittance-diagram can be used in which one starts from a parallel arrangement and in which the equivalent values of a series arrangement are found. In said diagrams the conductance values are drawn on the $x$-axis and the susceptance values on the $y$-axis.

A difficulty of said system is, that the complete diagrams are not clear because of the large number of circles, whereas the range is fairly small as a result of the linear graduation.

If the scales are drawn logarithmically the circles change into logarithmic curves, which can be drawn on paper.

An advantage is, that on a paper sheet of certain dimensions a much larger range can be comprised. Such logarithmic diagrams however are very confusing as a result of the large number of curves so that the use is strongly hampered, the more so as two systems of curves are present, each of which must be provided with an index.

An example of such a diagram is published in "Electronics," December 1941, "Polar rectangular and rectangular-reciprocal vector charts," by Paul W. Klipsch.

The invention simplifies the use of such diagrams and is based on the fact that both systems of curves consist of congruent curves so that in each system any arbitrary curve can be found by shifting an existing curve along a diagonal through the origin, said diagonal, if the graduations along the horizontal axis and along the vertical axis are equal, making an angle of 45° with both axes. Furthermore, the curves of each system are reflected images with respect to said diagonal of the curves of the other system.

The device constructed according to the invention substantially consists of a base having a logarithmically graduated axis-system for drawing the values of $X_s$ and $R_s$, said base also including a line passing through the origin and the points for which $X_s = R_s$, and of one or more stencils, provided with one or more curves, which are the locus of all values of $R_p$ constant and $X_p$ variable in which when the stencil curve is displaced parallel to itself along said line to pass through the point determined by $X_s$ and $R_s$ the point of intersection of the curve with said line going through the origin determines the values of $X_p$ and $R_p$ (in which $X_s$ and $R_s$ are the reactance and the resistance respectively of the series elements and $X_p$ and $R_p$ the values of the elements of the equivalent parallel arrangement).

Figure 2:
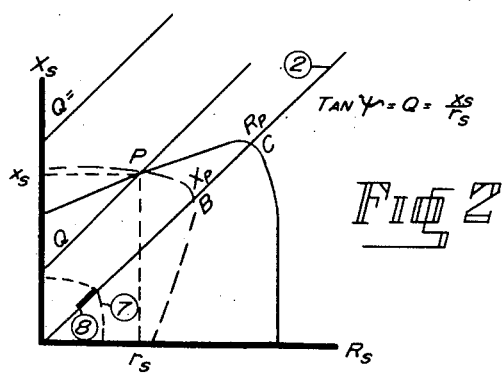

The invention now will be discussed with reference to the drawing wherein:

Fig. 1 is a plan view of an embodiment of the device;
Fig. 2 is a diagram to elucidate the operation;
Fig. 3 is a plan view of a further embodiment.

As shown in Fig. 1, a diagram carrier or base 1, consists of a sheet of paper or other suitable material having logarithmically divided mutually perpendicular axes, the horizontal axis of which is the $R_s$-axis and the vertical the $X_s$-axis. The logarithmic graduations along both axes are equal. In the diagram a diagonal 2, passing through the origin is indicated, said diagonal making an angle of 45° with both axes.

A distinct value of $R_p$ and $X_p$ respectively belongs to each curve. The diagonal 2 passes through the points of intersection of curve systems for which $R_p = X_p$ in ohms. At said points of intersection of the diagonal said values can be entered in such a way that on the diagonal a logarithmic scale is obtained. The points of the diagonal correspond to the double values of the corresponding $R_s$ and $X_s$ respectively. For the calculation of parallel arrangements in each point of the diagonal also the reciprocal value of the number is indicated. A system of stencils 3, 4 cooperates with said diagram carrier 1, one for the $R_p$- and one for the $X_p$-values, said stencils having the shape of logarithmic curves according to the publication of Klipsch, mentioned above.

According to the embodiment the base for the diagram carrier or paper sheet 1 is provided with two parallel guides 5, 6 between which the stencils 3, 4 fit so that if the sheet of paper 1 is provided on the base in such a way that the diagonal 2 is parallel to the guides 5, 6 the stencils 3, 4 can be displaced along the diagonal parallel to themselves.

In each position of the stencils 3 and 4 the circumference of the curved rim of the stencil will be the locus of all values of $R_p$-constant at $X_p$-variable, and of $X_p$-constant at $R_p$-variable respectively.

The stencils being each other's reflected image, it will be sufficient to have a single stencil, which can be placed right side up between the guides 5, 6 or turned upside down by rotation through 180° around the diagonal 2 as an axis.

The use of the device according to the invention now will be discussed in respect with Fig. 2.

Supposed that one has a series arrangement of $r_s$ and $x_s$ of which the values of the equivalent parallel arrangement are to be determined, then on both axes the values $r_s$ and $x_s$ are drawn, which together determine the point P. If now the stencil 4, the curve of which indicates the values of $X_p$ is laid with the curve through the point P, the intersection point B of the curve with the diagonal 2 indicates directly the corresponding value of $x_p$. If the stencil is turned upside down to correspond to stencil 3 and is shifted in such a way that its curve passes through P the intersection point C of the curve with the diagonal 2 indicates the value of $r_p$ so that the data of the equivalent parallel arrangement are directly readable. For said second reading it is possible to use the second stencil 3, whereas if one wishes to use only one single stencil, said stencil after the first reading must be turned upside down around the diagonal.

The device as described also can be used for the determination of further data.

On the stencil to be used also a further curve 7 (Fig. 2) can be provided, said curve being the locus of the points with equal absolute value of the impedance. If said curve is arranged through point P the intersection point of said curve with the diagonal 2 will indicate the value $Z\sqrt{2}$.

To find the value Z the value as indicated by the curve is to be divided by $\sqrt{2}$. If on the stencil along the line, coinciding with the with the diagonal 2 from the intersection-point with the Z-curve 7 a line 8 is provided in the direction of the origin of the axis system, the length of which being similar to a division by $\sqrt{2}$ according to the concerning logarithmic scale, the end of said line 8 in the diagonal will indicate on the two scales along the diagonal the value of Z and of its reciprocal respectively. As $$\text{tangent } \psi = Q = \frac{X_s}{R_s}$$

the lines on the paper sheet for $Q$=constant will be lines parallel to the diagonal 2. So the line through the point P directly indicates the value of Q and said value corresponds to the number on the $X_s$-axis in the intersection point of the Q-line with said axis. On the paper sheet 1, or in the base-line of the stencil, or along the curve of said stencil the values of Q can be indicated so that also these values are directly readable.

The sheet of paper 1 can be replaced by a photographic print or a sheet of metal on which the necessary graduations are provided. If it is desired for certain electric circuits to draw the curves or a part thereof it is possible to cover the sheet 1 which a sheet of translucent material.

In case the device only is used for the determination of the values of the data to be determined the device can have a more simple shape and it can be made in the shape of the known slide-rule, Fig. 3 being an example thereof.

According to said figure the base 1 is arranged lengthwise the slide in such a way that its diagonal 2 is parallel to the length direction of the slide. The values of $R_p$ and $X_p$ are provided laterally of the graduations indicating the values of $R_s$ and $X_s$.

The curves 3, 4 and 7 are provided on a slider so that each point on the diagram can be reached by shifting the slider, which at the same time locates a corresponding point on the diagonal 2 of the diagram. The width of the diagram can be such that the frequently occurring and practical values can be found on it.

As the graduations along the diagonal are difficult to read off as a consequence of the logarithmic division, a scale or graduation is provided separately on the slide-rule outside the diagram itself. Said scale is indicated along the lower margin of the base 1 and the division can be the same as that of the diagonal 2 of Fig. 1. In line with the point where the curves 3 and 4 intersect the diagonal 2 and over the scale an index 10, 10' is provided on the slider.

For the $\sqrt{2}$ value of the curve 7, i. e. the point 8, an index 11 is provided on the slider. By shifting the slider also the curves 3 and 4 can be used successively.

A more simple construction can be obtained if one is willing to give up the separate scales R and X and to make use of the fact that for all values $X_s > R_s$, $X_p$ will be $< R_p$ and that for $X_s < R_p$, $X_p$ will be $> R_p$. From the symmetry of e. g. Fig. 3 it appears that the values to be read off for $R_p$ and $X_p$ at given values of $R_s$ and $X_s$ will be the same as those for $X_p$ and $R_p$, if the value of $R_s$ should be pegged out on the X-axis and the value of $X_s$ on the $R_s$-axis.

For this reason it will be possible to halve the diagram-carrier 1 (Fig. 3) by taking the diagonal as the limit.

In a similar way an embodiment can be used which is based on the admittance-circles instead of the impedance-circles, whereas also a combination of both embodiments can be used.

It is not necessary that both logarithmic scales are equal nor that the appertaining axis system is perpendicular. In this case the "diagonal" becomes a straight line, connecting the points for which $R_s = X_s$. It is obvious that the shape of the curves in this case will change.

I claim:

1. A device for determining the resultant of series or parallel complex resistances in arbitrary combinations comprising a base having a logarithmically graduated co-ordinate system including $X_s$ and $R_s$ axes and a diagonal line passing through points defined by $X_s = R_s$, and a member displaceable parallel to itself along said diagonal line, said member having a curve that cooperates with the coordinate system and that is the locus of $R_p$=constant with $X_s$ and $R_s$ variable wherein $X_s$ is the series reactive impedance, $R_s$ is the series resistance, and $R_p$ is the equivalent parallel resistance.

2. A device according to claim 1 in which the diagonal line is graduated, the values of the graduations being twice the value of the corresponding axes graduations.

3. A device according to claim 1 in which the diagonal line has two sets of graduations, one of which is the reciprocal of the other.

4. A device according to claim 1, having a second member which has a curve that is the locus of $X_p$ constant with $R_s$ and $X_s$ variable.

5. A device according to claim 1 in which the member has two curves one of which is the locus of $R_p$ constant with $R_s$ and $X_s$ variable and the other the locus of $X_p$ constant with $R_s$ and $X_s$ variable.

6. A device according to claim 5 in which the member is inverted to provide the second curve.

7. A device according to claim 1 in which one edge of the member constitutes the curve.

8. A device according to claim 1 having guides parallel to the diagonal line and adapted to restrict the member to movement along the line.

9. A device according to claim 2 in which the member has a second curve that is the locus of the absolute value of Z equal to a constant with $X_s$ and $R_s$ variable.

10. A device according to claim 9 in which the member has an index displaced from the second curve along the diagonal line at a distance to indicate a graduation having half the value of the graduation intercepted by the second curve.

References Cited in the file of this patent

FOREIGN PATENTS 713,655     Great Britain _____ Aug. 18, 1954